(12) United States Patent  (10) Patent No.: US 9,160,630 B2
Wong et al.  (45) Date of Patent: Oct. 13, 2015

(54) NETWORK CONNECTIVITY AND SECURITY VISUALIZATION

(75) Inventors: Karen Natalie Wong, San Carlos, CA (US); Peter J. Shepherd, San Jose, CA (US); Alex Smolen, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 55 days.

(21) Appl. No.: 13/155,193

(22) Filed: Jun. 7, 2011

(65) Prior Publication Data

US 2012/0317491 A1  Dec. 13, 2012

(51) Int. Cl.
| | |
|---|---|
| G06F 15/177 | (2006.01) |
| G06F 15/173 | (2006.01) |
| G06F 3/00 | (2006.01) |
| G06F 3/048 | (2013.01) |
| H04L 12/24 | (2006.01) |
| G06F 3/06 | (2006.01) |
| H04L 29/08 | (2006.01) |

(52) U.S. Cl.
CPC ............ H04L 41/22 (2013.01); H04L 41/5096 (2013.01); *G06F 3/067* (2013.01); *G06F 2206/1008* (2013.01); *H04L 67/10* (2013.01)

(58) Field of Classification Search
USPC ........................................................ 715/736
See application file for complete search history.

(56) References Cited

U.S. PATENT DOCUMENTS

| | | | | |
|---|---|---|---|---|
| 6,310,883 | B1 * | 10/2001 | Mann et al. ................... | 370/408 |
| 6,833,850 | B1 * | 12/2004 | Arquie et al. ................. | 715/734 |
| 6,854,091 | B1 * | 2/2005 | Beaudoin ...................... | 715/854 |
| 7,475,351 | B1 * | 1/2009 | Johnson ........................ | 715/736 |
| 7,519,700 | B1 * | 4/2009 | Sapsford et al. .............. | 709/223 |
| 8,272,061 | B1 * | 9/2012 | Lotem et al. .................... | 726/25 |
| 2002/0007455 | A1 * | 1/2002 | Wiederin et al. .............. | 713/162 |
| 2003/0130821 | A1 | 7/2003 | Anslow et al. | |
| 2004/0187033 | A1 * | 9/2004 | Wang ............................. | 713/201 |
| 2005/0182773 | A1 * | 8/2005 | Feinsmith ...................... | 707/100 |
| 2008/0005675 | A1 * | 1/2008 | Alderson et al. .............. | 715/734 |
| 2008/0104391 | A1 * | 5/2008 | Fukuta et al. ................. | 713/153 |
| 2011/0173438 | A1 * | 7/2011 | Matzkel ........................ | 713/150 |
| 2011/0225524 | A1 * | 9/2011 | Cifra ............................. | 715/763 |
| 2012/0054714 | A1 * | 3/2012 | Novak et al. .................. | 717/105 |

OTHER PUBLICATIONS

Merriam-Webster Dictionary definition for "Align", Merriam-Webster online dictionary, http://www.merriam-webster.com/dictionary/align, retrieved Sep. 27, 2013.*

* cited by examiner

*Primary Examiner* — Doon Chow
*Assistant Examiner* — Shourjo Dasgupta

(57) ABSTRACT

A method for displaying a graphical user interface for a computing environment including computing resources that are provided to a plurality of organizations over one or more external networks includes displaying representations of the one or more external networks. The method further includes displaying a first node in the graphical user interface that is connected to the representations of at least one of the one or more external networks, where the first node is associated with a first organization; displaying an aggregate node in the graphical user interface that is associated with a plurality of other organizations besides the first organization; receiving a selection to view details of the first organization; and displaying an expanded view of the first organization in the graphical user interface in response to the selection.

20 Claims, 16 Drawing Sheets

NETWORK CONNECTIVITY AND SECURITY VISUALIZATION

BACKGROUND

Computer virtualization is a technique that involves encapsulating a physical computing machine platform into a virtual machine that is executed under the control of virtualization software running on a hardware computing platform (also referred to herein as "host system" or "host computer"). A group of hardware computing platforms may be organized as a cluster to provide the hardware resources for virtual machines. In a data center that employs virtual machines, it is common to see hundreds, even thousands, of virtual machines running on multiple clusters of host systems.

Cloud computing refers to distributed allocation of computing resources via a computer network rather than from a single local computer. A "cloud" can include one or more virtual centers, each virtual center including one or more data centers. Each data center can be comprises of one or more host computers or clusters of host computers.

An entity that provides cloud computing resources to other organizations can implement a cloud management application to manage the allocations of the computing resources to the organizations. For example, vCloud Director™ offered by VMware, Inc.® provides such management services. The cloud management application can allow cloud administrators to view the security of their networks between organizations and virtual applications.

Certain security issues may arise in a cloud computing environment. For example, different organizations connected to the same external network may be able to view, and potentially modify, another organization's traffic, which can lead to a security breach. Moreover, disabled firewalls may allow unauthorized network traffic into and out of a network.

Current approaches to cloud management applications implement a list-based or table-based approach to visualizing the organizations and network connections in the cloud. For example, one list may include a listing of the external networks and another list may include a listing of all of the organizations in the cloud with corresponding external networks. There is currently no way for the cloud administrator to easily and quickly ascertain the network connections for various organizations in the cloud and to identify possible security issues.

Accordingly, there remains a need in the art for a user interface for managing a cloud computing environment that addresses the drawbacks and limitations discussed above.

SUMMARY

One or more embodiments of the invention provide a graphical user interface that displays network connectivity of organizations that are represented as one or more nodes in the graphical user interface. With this graphical user interface, a system administrator can view the network connections of a large number of organizations. Additionally, the administrator can further view network connectivity details of a particular organization, including individual network connections of virtual applications (vApps), VMs, and organizational networks associated with the organization. Further, the nodes in the graphical user interface can be expanded or collapsed "in-place," meaning that the nodes appear in the same location relative to the other organizations in the graphical user interface. Also, in some embodiments, nodes that may exhibit security vulnerabilities can be displayed in a distinguished manner, such as with a different color, to allow the administrator to easily identify these nodes and perform corrective action. By providing these features, a user interface according to one or more embodiments allows the administrator to quickly and easily monitor the status of nodes in the cloud computing environment and perform corrective action, if necessary.

One embodiment of the invention provides a method for displaying a graphical user interface for a computing environment including computing resources that are provided to a plurality of organizations over one or more external networks includes displaying representations of the one or more external networks. The method further includes displaying a first node in the graphical user interface that is connected to the representations of at least one of the one or more external networks, where the first node is associated with a first organization; displaying an aggregate node in the graphical user interface that is associated with a plurality of other organizations besides the first organization; receiving a selection to view details of the first organization; and displaying an expanded view of the first organization in the graphical user interface in response to the selection.

DETAILED DESCRIPTION

Figure 1A:
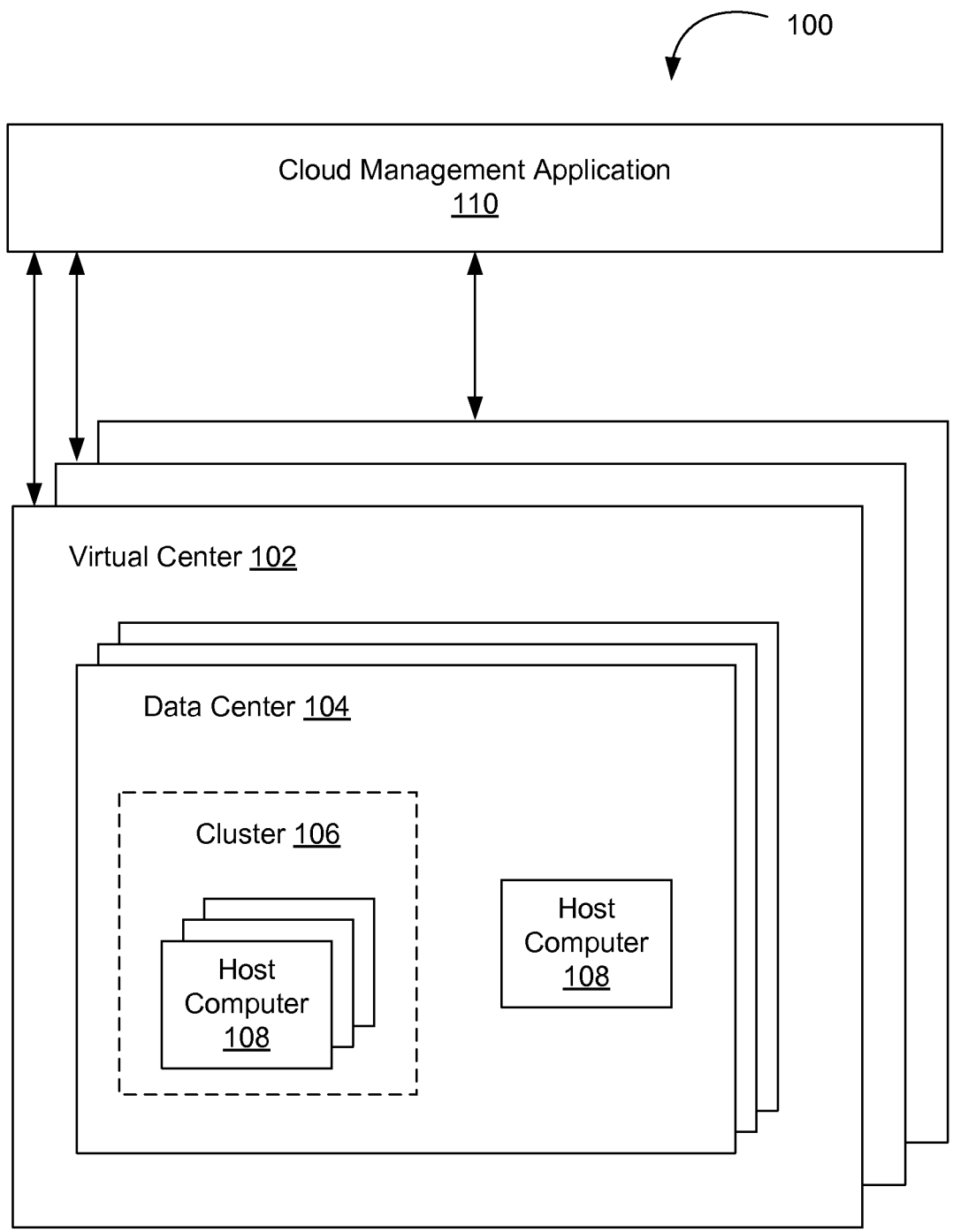
FIG. 1A depicts a block diagram of a virtualized computer system in which one or more embodiments of the present invention may be practiced.

FIG. 1A depicts a block diagram of a virtualized computer system 100 in which one or more embodiments of the present invention may be practiced. The computer system 100, which may include one or more virtual centers 102 and a cloud management application 110, in some cases, can be referred to as "the cloud." Host computers 108 (also referred to herein as "servers") are configured to deliver virtualization-based distributed services to information technology environments. Each host computer 108 provides a virtualization layer that abstracts processor, memory, storage, and/or networking resources into multiple virtual machines that run side-by-side on the same physical host computer 108. In one embodiment, virtualization software can be installed directly on the server hardware and inserts a virtualization layer between the hardware and the operating system. The virtualization software partitions a physical host computer 108 into multiple secure and portable virtual machines that run on the same physical server. Each virtual machine represents a complete system—with processors, memory, networking, storage, and/or BIOS.

Host computers 108 can be organized into a cluster 106. One or more clusters 106 and host computers 108 can then be organized into a data center 104. One or more data centers 104 can be organized into a virtual center 102. One or more virtual centers can be organized into the virtualized computer system 100, also referred to as "the cloud." The one or more virtual centers 102, and ultimately the host computers 108 included therein, can be managed via a cloud management application 110. The cloud management application 110 manages the virtual infrastructure, including managing the host computers 108, the virtual machines running within each host computer 108, provisioning, migration, resource allocations, and so on.

The management operations of the cloud management application 110 can be performed via a client application (not shown). For example, each configuration task, such as configuring storage and network connections or managing the service console, can be accomplished centrally through the client application. One embodiment provides a stand-alone application version of the client application. In another embodiment, the client application is implemented as a web browser application that provides management access from any networked device.

According to some embodiments, administrators can access to the cloud management application 110 to configure their cloud networks by presenting network connectivity, from the entire cloud to the individual virtual machine, in a scalable and interactive visualization. As described in greater detail herein, administrators can drill-down or search for cloud components or "nodes" to see how they connect to the overall network architecture. For example, risky network configurations can be automatically highlighted for further analysis so that they can be validated against security requirements. According to embodiments of the invention, the cloud management application 110 allows administrators to avoid network configuration mistakes that can turn into dangerous security vulnerabilities.

Figure 1B:
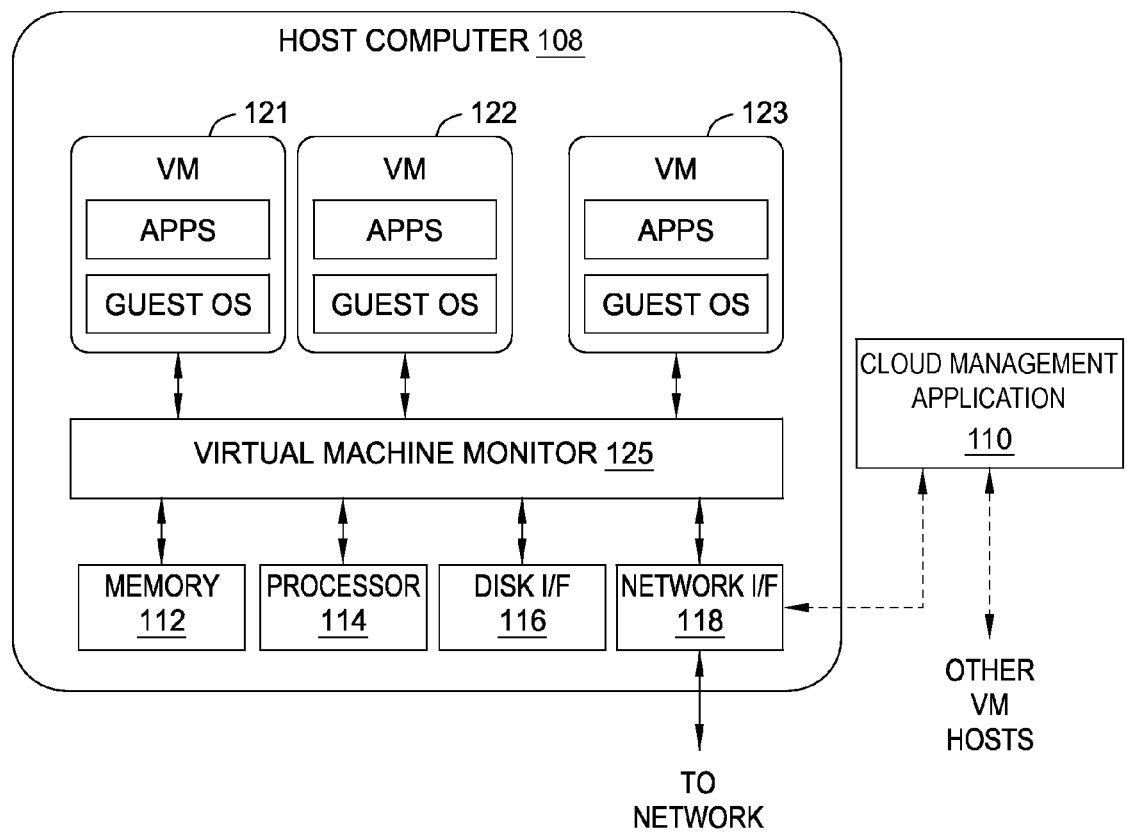
FIG. 1B depicts a block diagram of a host computer and cloud management center, according to one embodiment of the invention.

FIG. 1B depicts a block diagram of a host computer 108 and cloud management application 110, according to one embodiment of the invention. A virtualized environment includes a host computer 108 that has conventional components of a computing device, and may be implemented within a cluster 106 of computing devices, as shown in FIG. 1A. One or more virtual machines are configured within the host computer 108, represented in FIG. 1B as VM 121, VM 122, and VM 123, that share hardware resources of host computer 108, such as system memory 112, processor 114, disk interface 116, and network interface 118. Examples of disk interface 116 are a host bus adapter and a network file system interface. An example of network interface 118 is a network adapter, also referred to as a Network Interface Card (NIC). In some embodiments, a plurality of NICs is included in the network interface 118. The cloud management application may be coupled to the network interface 118 via a virtual center 102 server, which is coupled to a host computer 108, such an ESX host computer.

The virtual machines VM 121-123 run on top of a virtual machine monitor 125, which is a software interface layer that enables sharing of the hardware resources of host computer 108 by the virtual machines. Virtual machine monitor 125 may run on top of the operating system of the host computer 108 or directly on hardware components of the host computer 108. In some embodiments, virtual machine monitor 125 runs on top of a hypervisor that is installed on top of the hardware resources of host computer 108. Together, the virtual machines 121-123 and virtual machine monitor 125 create virtualized computer systems that give the appearance of being distinct from host computer 108 and from each other. Each virtual machine includes a guest operating system and one or more guest applications. The guest operating system is a master control program of the virtual machine and, among other things, the guest operating system forms a software platform on top of which the guest applications run.

In one embodiment, data storage for host computer 108 is served by a storage area network (SAN) (not shown), which includes a storage array (e.g., a disk array) and a switch (SAN fabric) that connects host computer 108 to storage array via the disk interface 116. In virtualized computer systems, in which disk images of virtual machines are stored in the storage arrays, disk images of virtual machines can be migrated between storage arrays as a way to balance the loads across the storage arrays. For example, the Storage VMotion™ product that is available from VMware Inc. of Palo Alto, Calif. allows disk images of virtual machines to be migrated between storage arrays without interrupting the virtual machine whose disk image is being migrated or any applications running inside it. In other embodiments, any technically feasible data storage implementation, other than a SAN, can be used to provide storage resources for host computer 104.

Figure 2A:
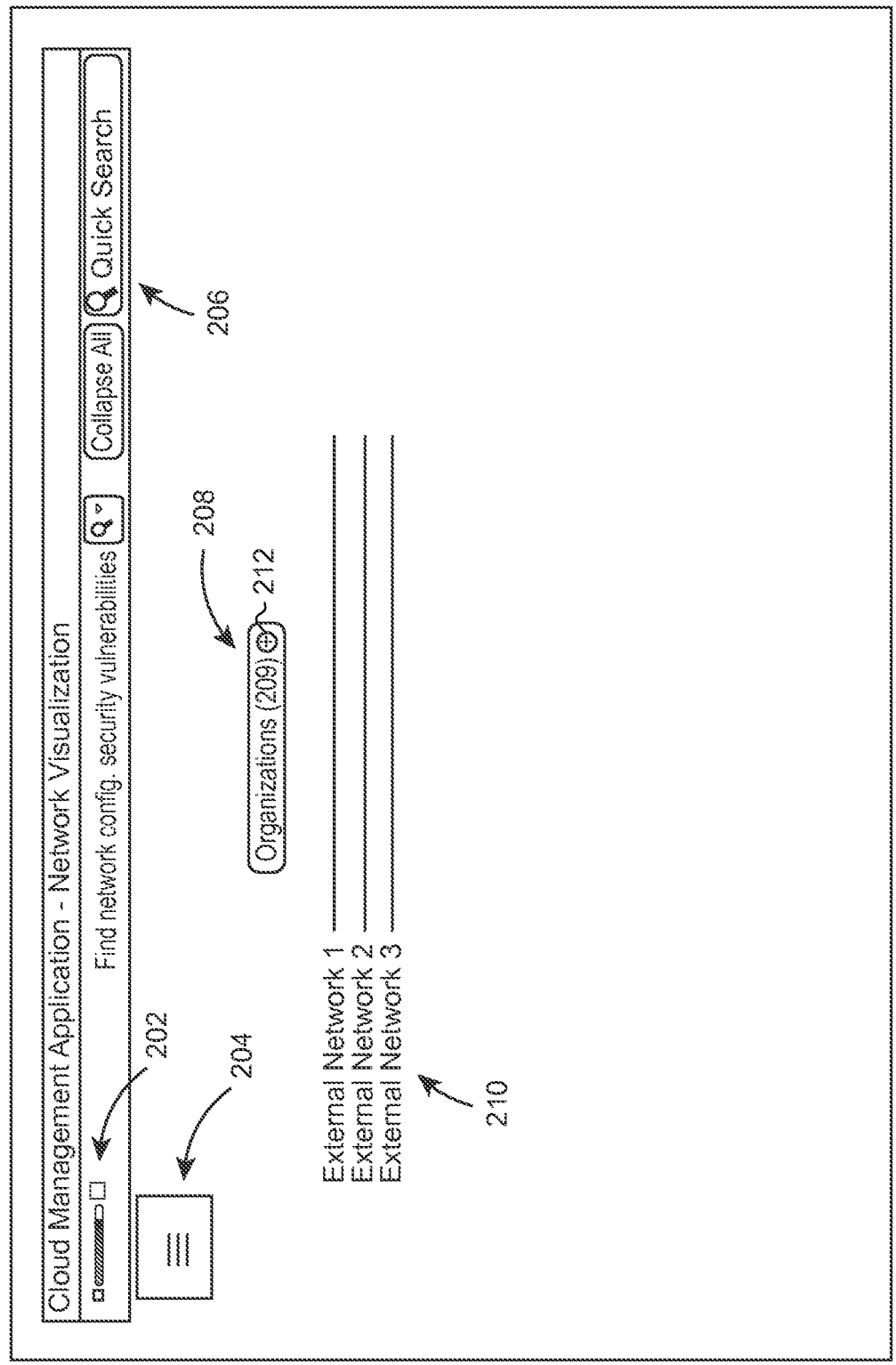
FIGS. 2A-2B depict screenshots of a user interface for managing one or more network connections in a distributed cloud computing environment, according to various embodiments of the invention.
Figure 2B:
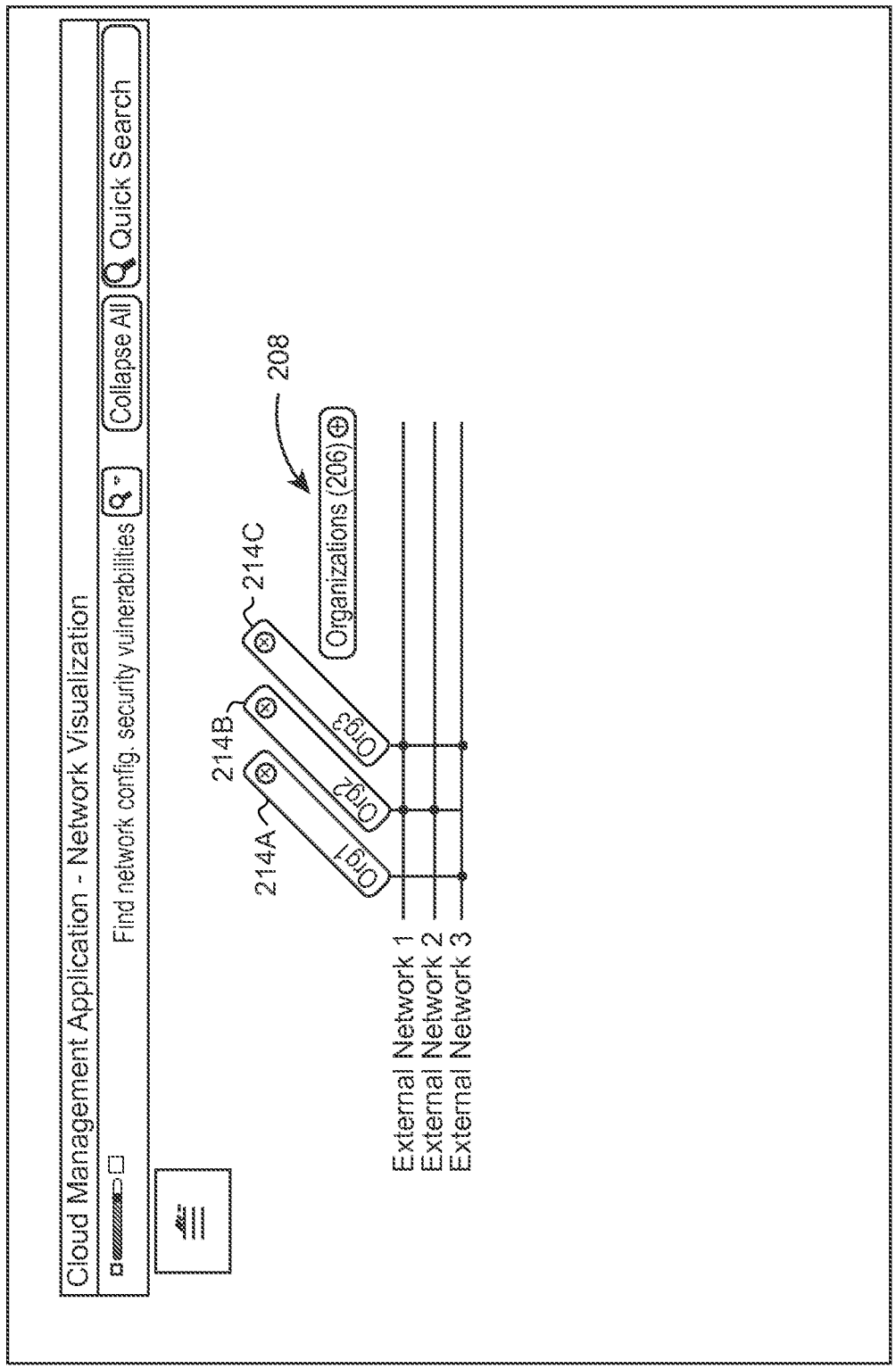

FIGS. 2A-2B depict screenshots of a user interface for managing one or more network connections in a distributed computing environment, according to various embodiments of the invention. A cloud provider may offer cloud computing resources to one or more organizations. For example, the cloud provider may offer a website where organization can register for computing resource utilization with different levels of service, e.g., "bronze," "silver," or "gold" levels of service. In one example, the gold level of service may be highest level of service, with the most computing resources and best service level guarantees.

The cloud provider then allocates the computing resources based on the requirements of a particular organization that utilizes the cloud provider's services. For example, the cloud provider allocates network computing access to the organization. The screenshot shown in FIG. 2A is an example of a user interface that is displayed in the cloud management application 110. As described in greater detail below, the user interface includes a zoom in/out portion 202, an overview/pan portion 204, a search portion 206, an organizations portion 208, and a networks portion 210. As shown in this example, there are three external networks in the cloud that the cloud administrator can allocate portions of to various organizations. As shown, there are 209 organizations that utilize resources of the cloud.

In order to accommodate large network diagrams with many nodes and connections, the zoom in/out portion 202 allows users to zoom in and out of the network diagrams. Also, the overview/pan portion 204 allows users to pan across the network diagram to view different portions of the network diagram. In one example, the overview/pan portion 204 illustrates a complete zoomed-out view of the content of the user interface of the cloud management application 110. For example, at a certain level of zoom, the labels for particular nodes in the network diagram may not be legible, thus the user can zoom in/out and/or pan around the network diagram to view the relevant portions of the network diagram legibly.

The cloud administrator can select the plus icon 212 (also referred to as the "maximize" or "expand" icon) in the user interface to expand the organizations portion 208. As shown in FIG. 2B, three organizations 214A, 214B, 214C are expanded and the organizations portion 208 now shows that there are 206 additional organizations that utilize resources of the cloud, for a total of 209 organizations. As also shown in FIG. 2B, the network connections to the networks in the cloud are indicated for the three organizations 214A, 214B, 214C. Organization 214A is allocated network resources via external network 3, organization 214B is allocated network resources via external networks 1 and 2, and organization 214C is allocated network resources via external networks 1 and 3.

In the embodiment s shown in FIGS. 2A-2B, clicking on the plus icon 212 in FIG. 2A causes three of the organizations to be expanded from the group of 209 organizations. The organizations can be expanded alphabetically, randomly, based on most recent, based on most popular, or in any other manner. According to various embodiments, the number of organizations that are expanded when the user selects the plus icon 212 can be configurable, and can include expanding all of the organizations. Similarly, selecting the plus icon 212 from the organizations portion 208 shown in FIG. 2B can cause additional organizations to be expanded.

However, when the number of organizations is large, expanding the organizations a few at a time may not be very useful to the administrator who may be looking to drill down or further examiner a particular organization. Also, expanding all of the organizations at once may cause the user interface to become cluttered and unmanageable, especially when the number of organizations is large.

Figure 3A:
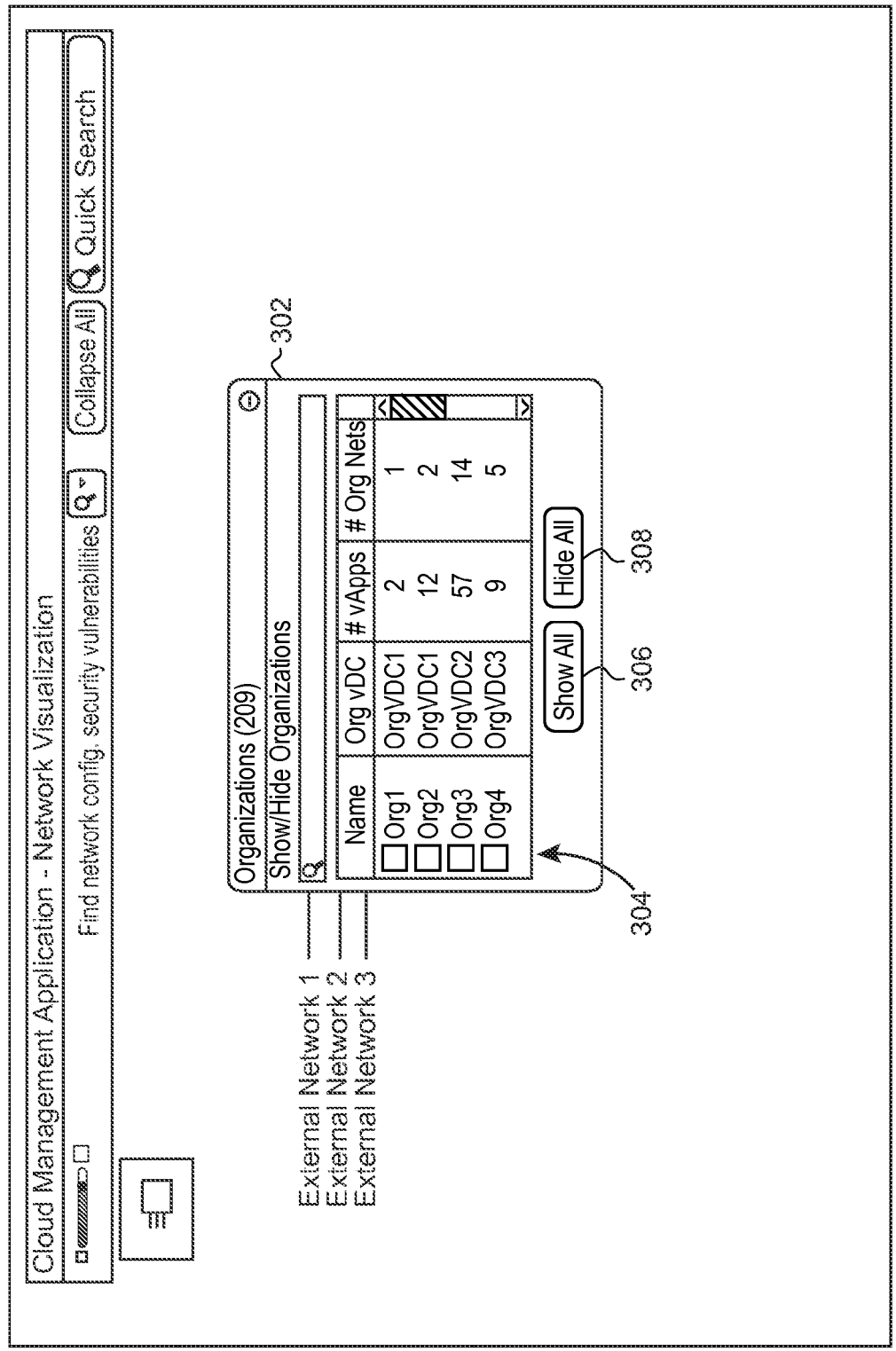
FIGS. 3A-3C depict screenshots of a user interface for selectively expanding an organizations portion of the user interface, according to various embodiments of the invention.
Figure 3B:
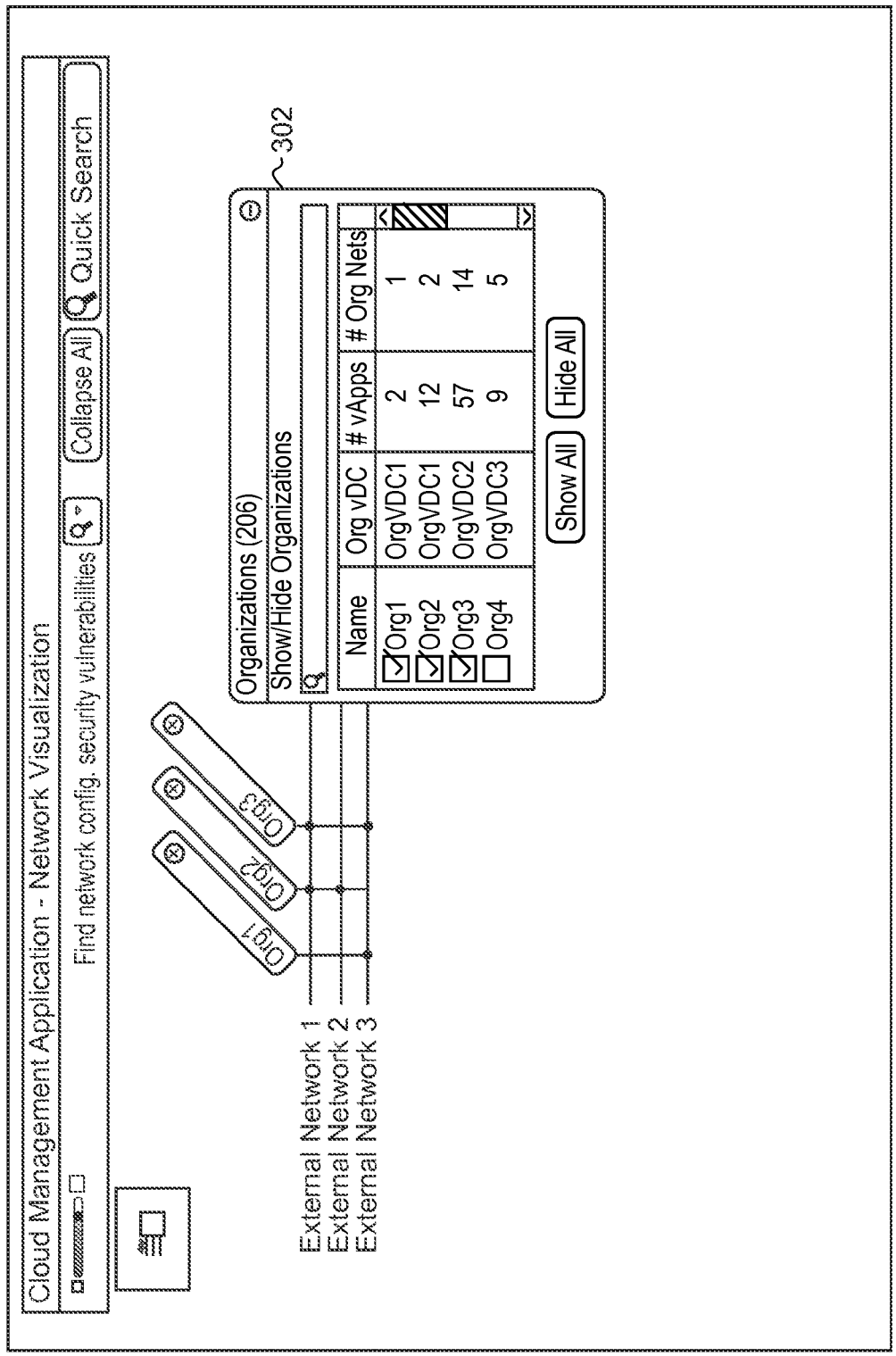
Figure 3C:
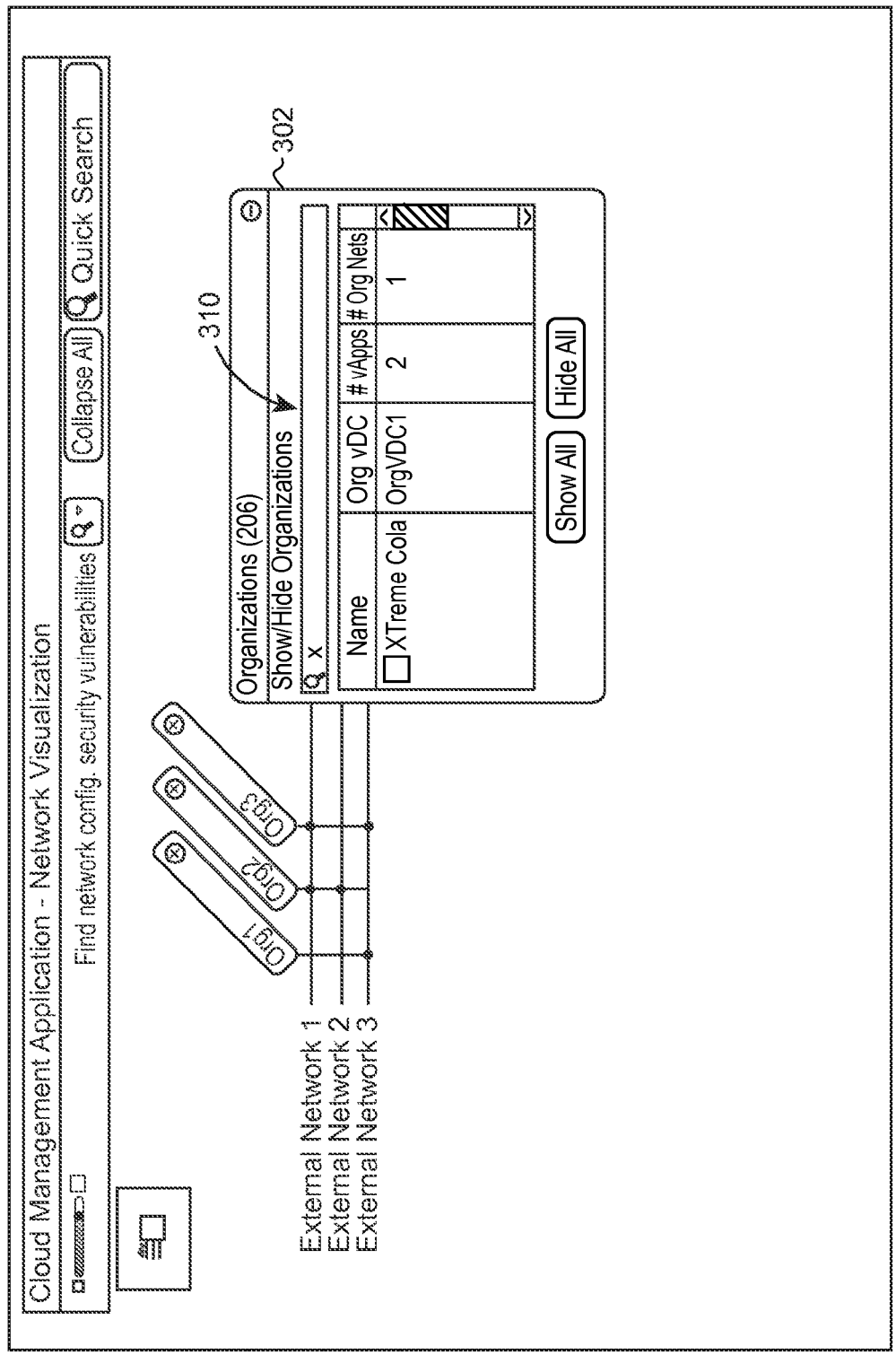

Accordingly, embodiments of the invention provide techniques for the administrator to select certain organizations to be expanded from the organizations portion 208. FIGS. 3A-3C depict screenshots of a user interface for selectively expanding an organizations portion of the user interface, according to various embodiments of the invention. In one embodiment, when the administrator select the plus button in the organizations portion (e.g., organizations portion 208 shown in FIG. 2A), a window 302 can be displayed. The window 302 includes a listing of the 209 organizations. The administrator may select one or more checkboxes 304 that correspond to the organizations to choose which organizations should be expanded. Also, selecting a "show all" button 306 causes all of the organizations to be expanded, and selecting a "hide all" button 308 causes all of the organizations to be collapsed back into the organizations portion 208.

As shown in FIG. 3B, the administrator has selected the checkboxes associated with three organizations that are shown expanded from the remaining organizations. The window 302 now indicates that there are 206 additional organizations to can be expanded. The list shown in window 302 may be sortable by various properties. The list can also provide for a multi-select feature that selects multiple organizations when the administrator holds down shift and/or ctrl keys on a keyboard.

As shown in FIG. 3C, the window 302 also includes a search field 310, where the administrator can type in search terms to search for organizations to expand. In the example shown, the administrator has typed in the letter "X," which causes all of the organizations that begin with and/or include the letter X to be displayed in the window 302. As shown, the organization "XTreme Cola" is displayed in the window 302.

In one embodiment, as the user selects organizations to expand from the group of organizations, the visualization shown in the user interface may move the entire diagram to the right or left. This facilitates quickly selecting a group of organizations to display without having to re-center or re-position the cursor or user interface.

Figure 4A:
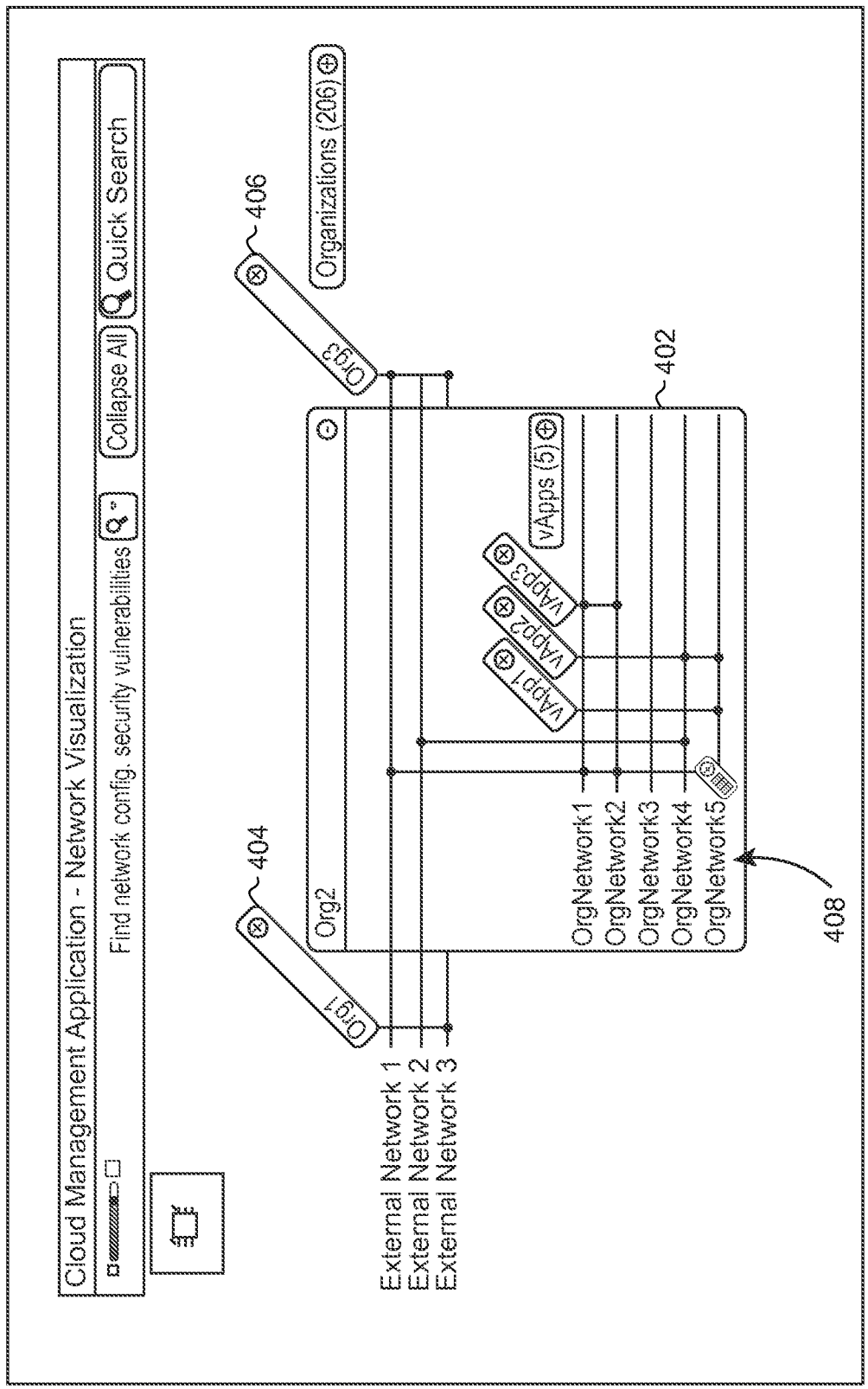
FIGS. 4A-4C depict screenshots of a user interface for viewing additional details of the network connections of a particular organization, according to various embodiments of the invention.
Figure 4B:
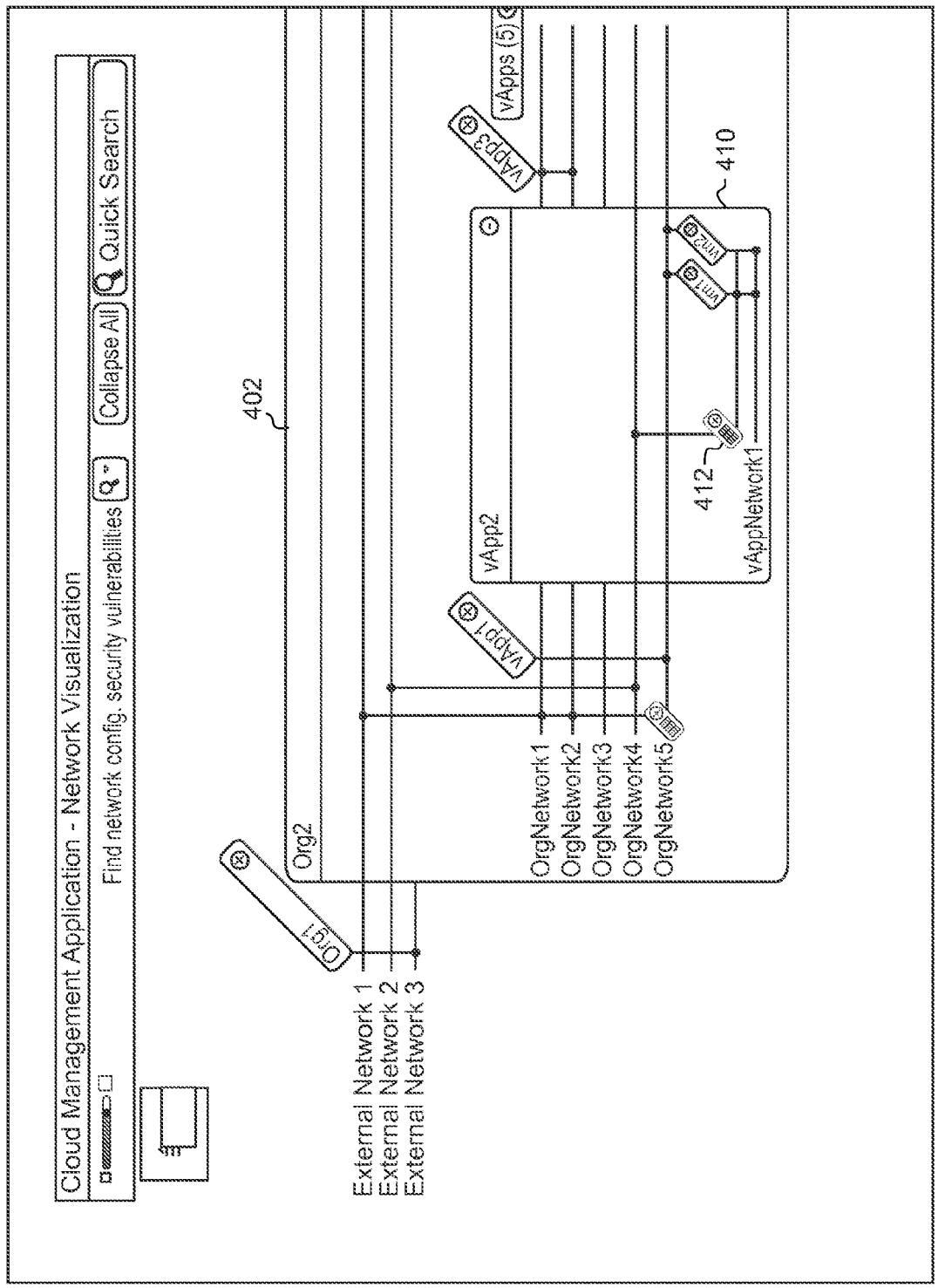
Figure 4C:
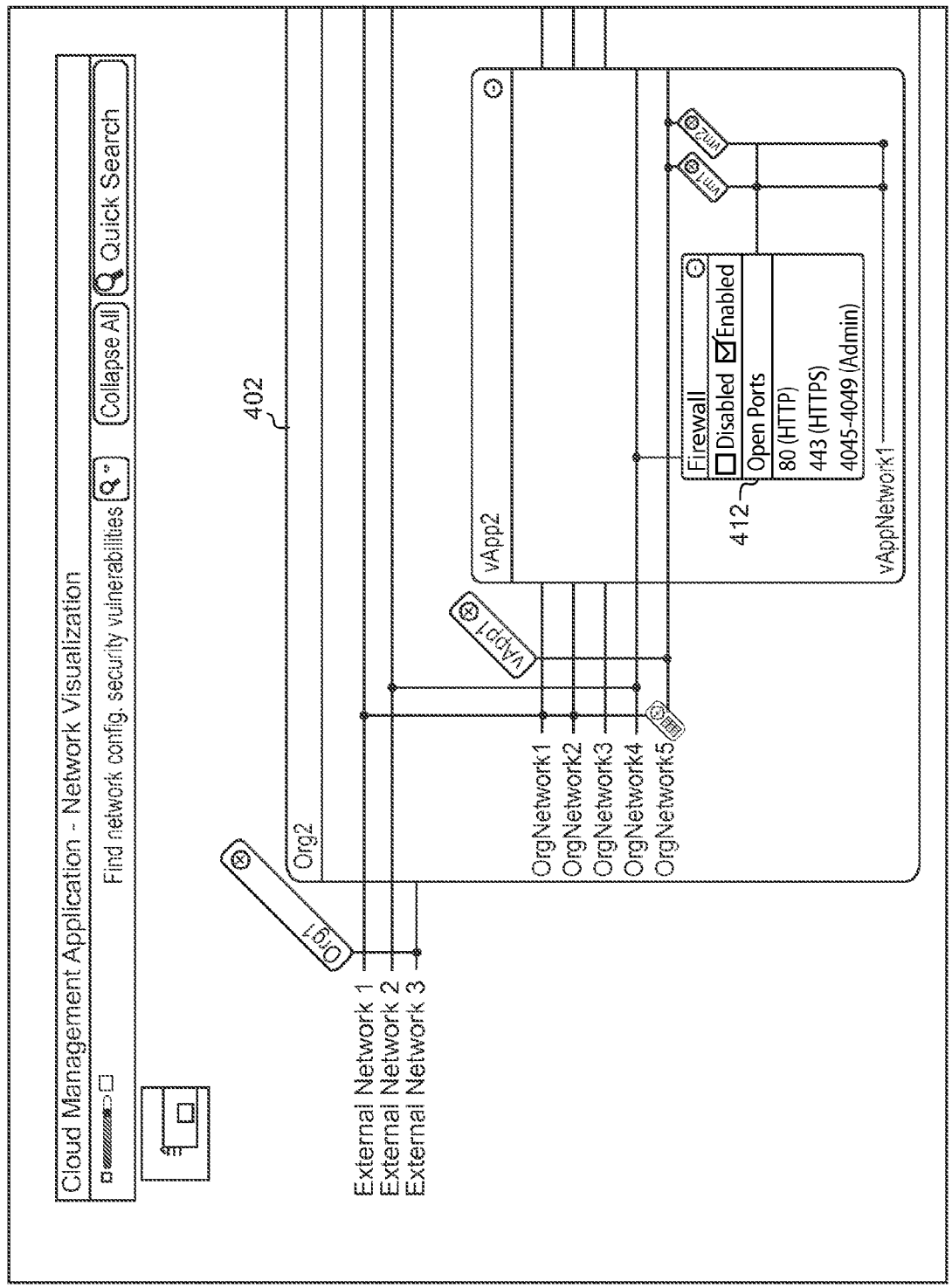

FIGS. 4A-4C depict screenshots of a user interface for viewing additional details of the network connections of a particular organization, according to various embodiments of the invention. In one example, selecting the expand icon associated with a particular organization causes additional details of the network connections for the organization to be displayed in node 402. As shown, the node 402 is displayed "in-place," with the node 404 displayed to the left of node 402 and node 406 displayed to the right of node 402, maintaining the organization of the user interface.

As shown, the node 402 includes a listing of organizational networks 408 (i.e., OrgNetwork1, OrgNetwork2, OrgNetwork3, OrgNetwork4, OrgNetwork5). The organizational networks 408 may be allocated by the cloud administrator when the network resources for the organization associated with node 402 are allocated to the organization. Some of the organizational networks 408 are directly connected to external networks (i.e., OrgNetwork1, OrgNetwork2, OrgNetwork4), some of the organizational networks 408 have a routed connection represented as a firewall (i.e., OrgNetwork5), and other organizational networks 408 are not connected to an external network or "isolated" (i.e., OrgNetwork3). In some embodiments, a routed connection indicates that some address translation is being performed for transactions that flow along that branch of the network. In this manner, a more secure connection is provided since a computer's machine address can be masked and an external IP (Internet Protocol) address is not exposed.

Also shown in node 402 are virtual applications, or "vApps," which represent services the organization is running. In one embodiment, a vApp is a logical entity comprising one or more virtual machines, which may use the industry-standard Open Virtualization Format to specify and encapsulate components of a multi-tier application, as well as the operational policies and service levels associated with the application. For example, the vApps may include one or more collections of virtual machines (VMs) or other services. An example of a vApp is a 3-tier email or database service composed of client, middleware, and server VMs. In some cases, there may be a large number of vApps running in or used by a particular organization and the vApps can be grouped together, similar to the grouping of organizations shown in FIGS. 2A-2B. In the example shown in FIG. 4A, there are eight vApps included in the organization associated with node 402. Three of the vApps are expanded (i.e., vApp1, vApp2, vApp3), and the remaining five vApps remain grouped together.

As shown in FIG. 4A, representations of the networks, including the external networks and organizational networks 408, are displayed horizontally as a line, and the organizations and vApps are displayed above the respective networks to which they are connected. The organizations and vApps are connected to the network with vertical line, where a visual indicator, such a dot, indicates to which network the organizations and vApps are connected. In some embodiments, displaying the networks, organizations, and vApps in this manner provides the administrator a clearer view of the overall network and provides for easier network management.

The administrator can further "drill-down" to view the details of a particular vApp, as shown in FIG. 4B. As shown in FIG. 4B, the administrator has selected an expand icon associated with vApp2, associated with node 410. vApp2 includes two VMs, vm1 and vm2, and a firewall connection 412. As shown, vm1 and vm2 are both directly connected to OrgNetwork5. vm1 is also connected via a routed connection to OrgNetwork4. vm 1 and vm2 are also both directly connected to vAppNetwork1, which is a private network associated with this particular vApp, i.e., vApp2. The private network vAppNetwork1 is maintained by the organization. As also shown in FIG. 4B, the organizational networks 408 that are not connected to the node 410 (i.e., OrgNetwork1, OrgNetwork2, OrgNetwork3) are displayed to pass "behind" node 410, while the organizational networks 408 that are connected to node 410 (i.e., OrgNetwork4, OrgNetwork5) are displayed to pass "over" node 410 in the user interface. This allows the administrator to see a less cluttered view of the organizational networks 408 that are connected to node 410.

In addition, in some embodiments, the firewall connection 412 can further be expanded to view additional details of the firewall, as shown in FIG. 4C. A shown, examples of details that can be displayed include a selection of whether the firewall is enabled or disabled, and a listing of open ports. Other details may also be displayed. In still further embodiments, the administrator can expand individual VMs of a vApp to view details of the VM, for example, through which NIC the VM is connected to the network.

Figure 5A:
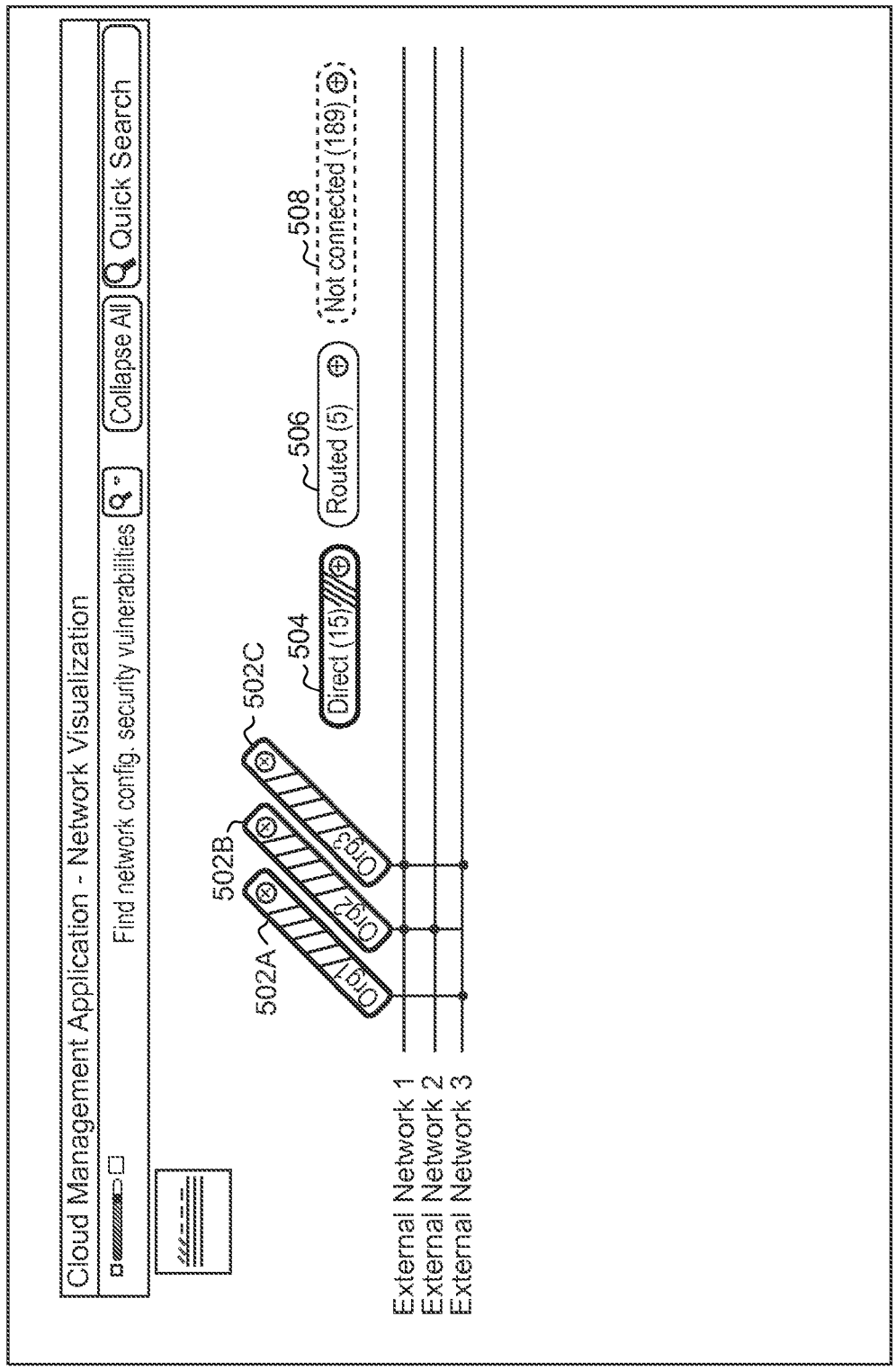
FIGS. 5A-5B depict screenshots of a user interface for viewing the network connectivity of various organizations, according to various embodiments of the invention.
Figure 5B:
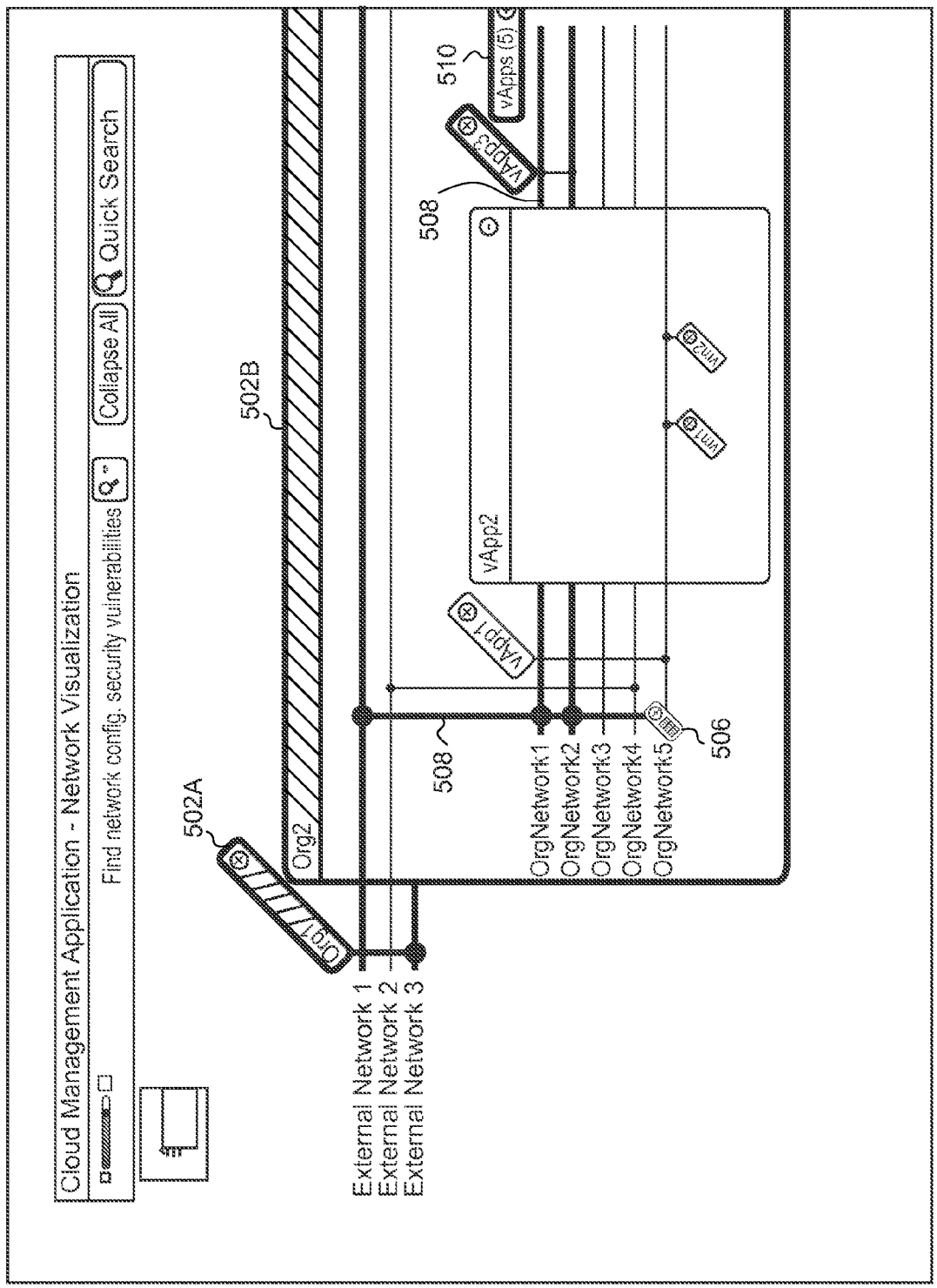

FIGS. 5A-5B depict screenshots of a user interface for viewing the network connectivity of various organizations, according to various embodiments of the invention. In the embodiment shown in FIG. 5A, the organizations are grouped according to network connectivity. The organizations can be grouped into a first group of "directly connected" organizations, a second group of "routed" organizations, and third group of "not connected" organizations. As described above, providing a routed connection can provide superior network security to the organization, when compared to a directly connected connection.

In the example shown in FIG. 5A, there are 18 organizations that are directly connected to the network, including organizations 502A, 502B, 502C and fifteen additional organizations grouped together in node 504. There are also five "routed" organizations grouped together in node 506, and 189 "not connected" organizations grouped together in node 508. According to one embodiment, the directly connected organizations can be displayed having a different color (e.g., red) than the routed organizations (e.g., green) and the not connected organizations (e.g., gray). Displaying the directly connected organizations in a different color allows the administrator to quickly identify which organizations may be vulnerable to network security issues. Accordingly, the administrator can then assess the situation and can perform management operations (such as adding routed connections or firewalls) to resolve or correct these security issues.

FIG. 5B illustrates a screenshot of expanding organization 502B to view additional details regarding the network connectivity of the organization. As described above, the organization 502B can be displayed with a different color, such as red, to indicate that at least a portion of the organization is directly connected to the network. In FIGS. 5A-5B, the directly connected nodes in the network are shown with a bold line surrounding organization the node and diagonal lines within the node. As shown, organization 502B includes vApp1, vApp2, vApp3 and five additional vApps grouped together in node 510. As also shown, organization 502B includes organizational networks OrgNetwork1, OrgNetwork2, OrgNetwork3, OrgNetwork4, and OrgNetwork5. OrgNetwork5 is routed via router 506.

vApp1 is connected to OrgNetwork5 via the router 506 and is thus considered a "routed" vApp. Routed vApps, such as vApp1, can be displayed in the same color as routed organizations (e.g., green). vApp2 is also connected to OrgNetwork5 via the router 506. Accordingly, vApp2 is also displayed as "routed" (e.g., with a green color). However, vApp3 is directly connected to OrgNetwork1 and OrgNetwork2 via direct connections, which are both directly connected to external network 1. vApp3 is therefore directly connect and is displayed with the same color as directly connected organizations (e.g., red). Also, the paths 508 that connect vApp3 to External Network 1 are also shown in red (as indicated by the bold lines) to show that those connections may be vulnerable. In addition, at least one of the five vApps grouped together in node 510 is directly connected, causing the node 510 to be displayed as directly connected (e.g., with a red color, indicated by bold line around the node and horizontal lines within the node). Although displaying the directly connected nodes in a different color is described herein, additional embodiments can display the directly connected nodes using any technique that allows those nodes to be visually distinguished from the routed nodes and the not connected nodes. Doing so allows the administrator to visually identify the directly connected nodes and take the necessary actions to add additional security (e.g., routers or firewalls) to the network connections for those nodes.

Additionally, in some embodiments, the user interface may provide tools for the administrator to "drag and drop" certain nodes into different portions of the network diagram, thereby changing the network connectivity of those nodes. Also, in some embodiments, a particular connection path can be highlighted when the administrator performs a "mouse-over" on the connection path by moving a mouse cursor over the connection path.

Figure 6:
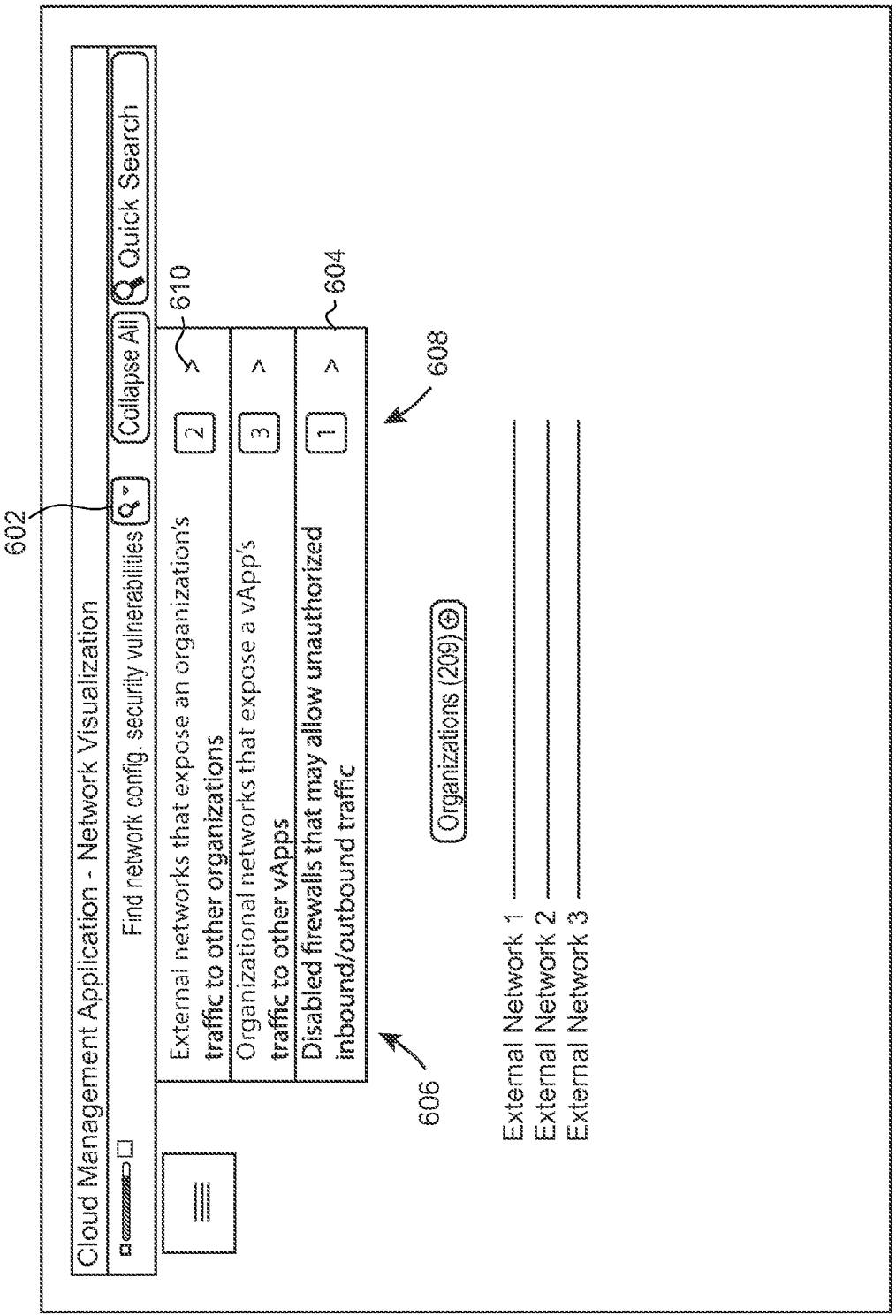
FIG. 6 depicts a screenshot of a user interface for viewing groups of security vulnerabilities, according to one embodiment of the invention.

FIG. 6 depicts a screenshot of a user interface for viewing groups of security vulnerabilities, according to one embodiment of the invention. As shown, a button 602 may be included in the user interface that, when selected by the administrator, causes a window 604 to be displayed. The window 604 includes a list 606 of various security vulnerabilities that may exist in the network. Examples of security vulnerabilities include (1) organizations connected to the same external network can view, and potentially modify, each others' traffic, (2) different vApps connected to the same organizational network can lead to wide-scale system compromise if one VM is exploited, and (3) disabled firewalls may allow unauthorized network traffic into and out of a network. The cloud management application 110 may be configured to periodically detect whether any of the vulnerabilities includes in the list 606 are found in the network. In some embodiments, the administrator may create custom vulnerabilities for the cloud management application 110 to monitor. Also shown in the window 604 is a count 608 for each of the vulnerabilities in the list 606. The administrator can then select an icon 610 to further expand a particular vulnerability to see which nodes are affected by this particular vulnerability. The administrator can then take corrective action to resolve the vulnerability. In some embodiments, after the user has expanded a particular vulnerability, the window 604 may allow the administrator to page-through each security vulnerability instance associated with that particular vulnerability. By providing groups of security vulnerabilities in the window 604, the cloud management application 110 provided a quick and organized way for the administrator to easily determine which nodes in the network are subject to these vulnerabilities.

Figure 7:
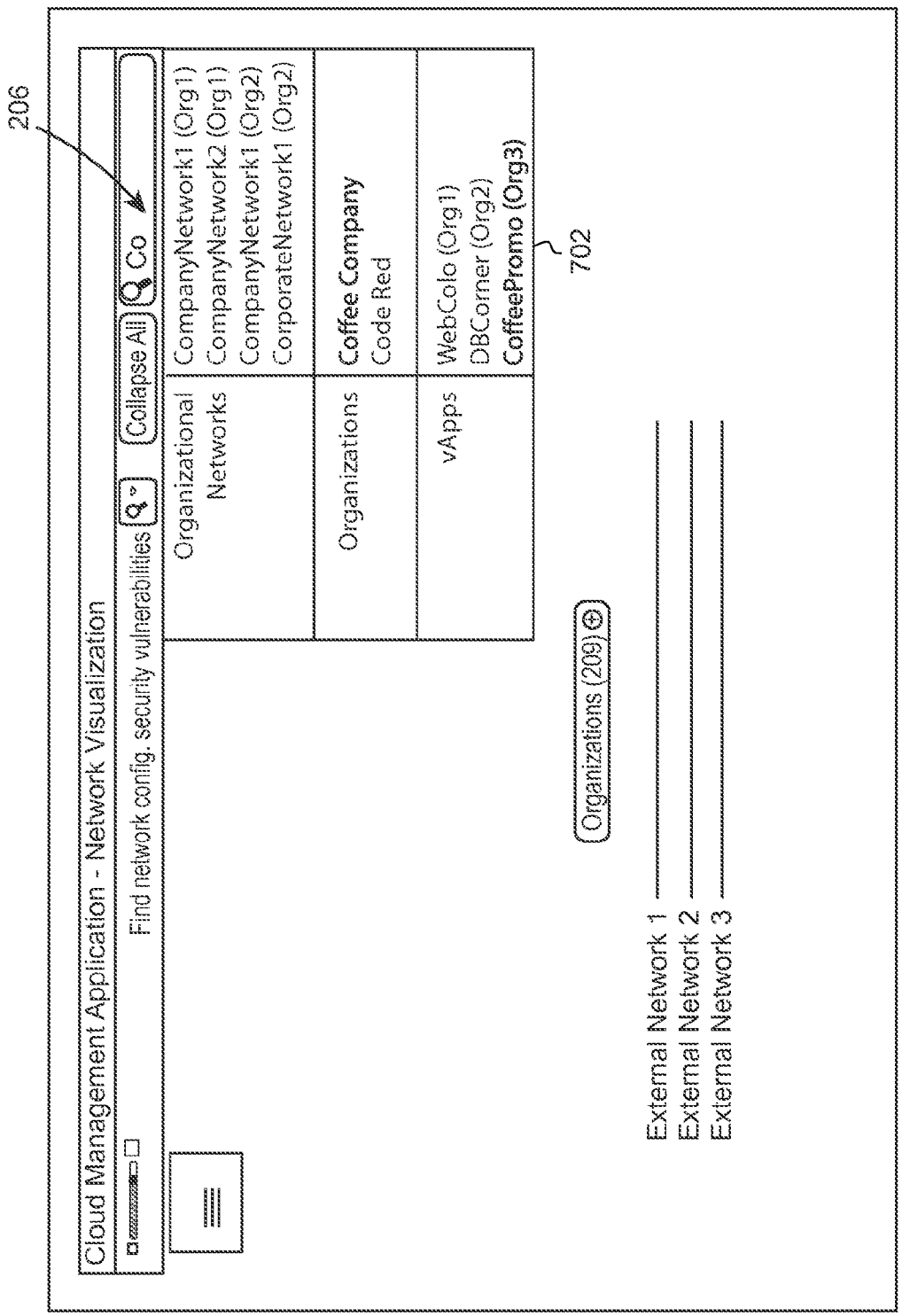
FIG. 7 depicts a screenshot of a user interface for searching for a particular node in the network diagram, according to one embodiment of the invention.

FIG. 7 depicts a screenshot of a user interface for searching for a particular node in the network diagram, according to one embodiment of the invention. As described, the user interface may include a search portion 206. The administrator can type search terms into a search field included in the search portion 206. In the example shown, the administrator has typed in the letters "Co" in the search field. Accordingly, a window 702 is displayed in the user interface that shows various nodes in the network diagram that include the letters "Co". The nodes can be organized into groups, such as Organization Networks, Organizations, vApps, or other groups. The administrator can then select one of the search results, causing the user interface to navigate to that particular node in the network diagram. When a large number of organizations and nodes are included in the network diagram, providing a search feature in the user interface can be a useful tool for administrators to quickly locate a particular node in the network diagram.

Figure 8:
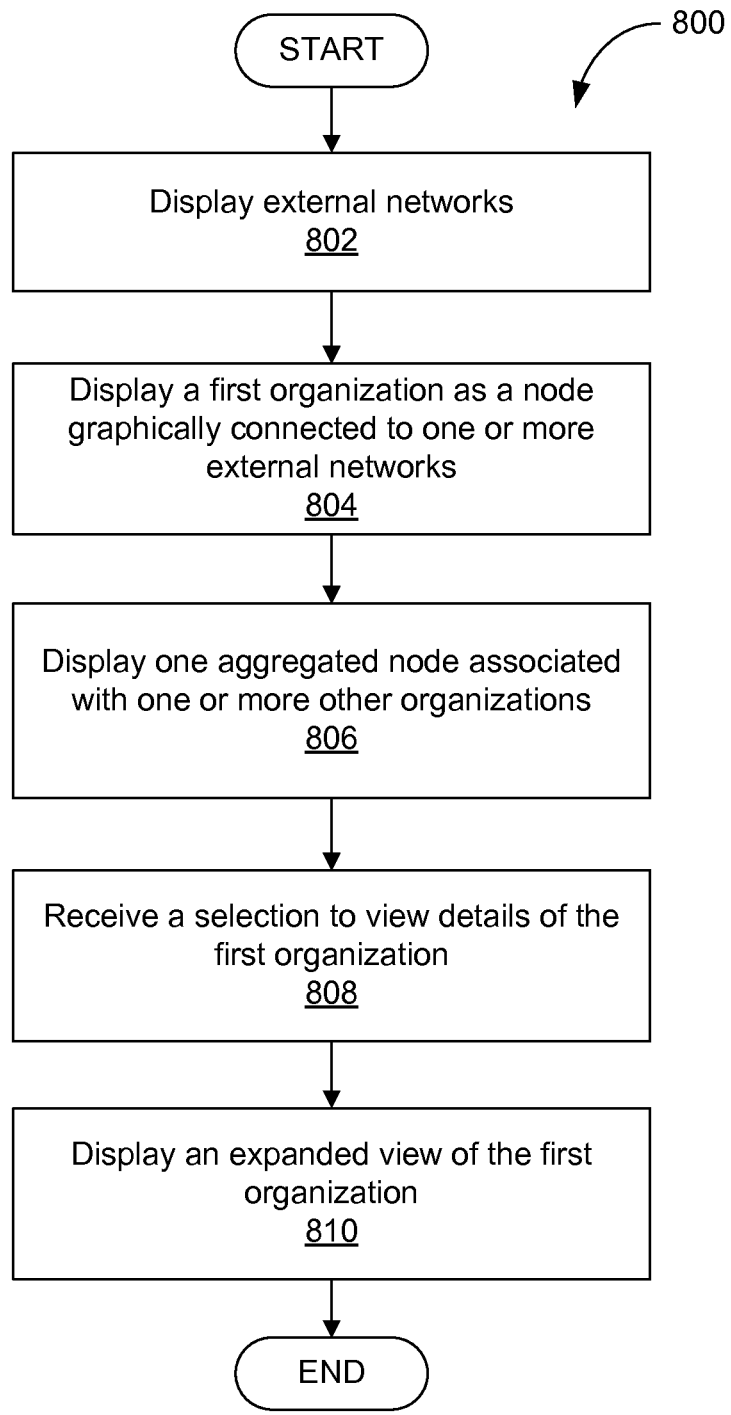
FIG. 8 is a flow diagram for graphically displaying network connectivity, according one embodiment of the invention.

FIG. 8 is a flow diagram for graphically displaying network connectivity, according one embodiment of the invention. Persons skilled in the art would understand that, even though the method 800 is described in conjunction with the systems of FIGS. 1A-7, any system configured to perform the method steps, in any order, is within the scope of embodiments of the invention.

As shown, the method 800 begins at step 802, where a cloud management application 110 displays one or more external networks. As shown in FIG. 2A, the external networks can be displayed as horizontal lines in the user interface. At step 804 the cloud management application 110 displays a first organization as a node that is graphically connected to one or more external networks. As shown in FIG. 4A, a node, such as node 404, is connected to external network 3. Node 402 in FIG. 4A is connected to external network 1 and external network 2, as indicated by the horizontal lines associated with external network 1 and external network 2 that are shown "over" the node 402; whereas, the horizontal line associated with external network 3 is are shown to pass "behind" the node 402, indicating that the node 402 is not connected to external network 3.

At step 806, the cloud management application 110 displays one aggregated node associated with one or more other organizations. As also shown in FIG. 2B, the organizations portion 208 includes one aggregated node that includes 206 organizations. The aggregated node may include a number that indicates the number of nodes that are grouped together in the aggregated node.

At step 808, the cloud management application 110 receives a selection to view details of the first organization. For example, the administrator may select a plus or "expand" icon associated with a node corresponding to the first organization. At step 810, the cloud management application 110 displays an expanded view of the first organization. According to various embodiments, the expanded view of the first organization can be displayed "in-place" relative to the other nodes in the network diagram. The expanded view can also shown organizational networks associated with the first organization, as well as how one or more vApps and/or one or more VMs connect to the organizational networks. In some embodiments, the network connections can be either direct connections or routed connections, as described above.

Figure 9:
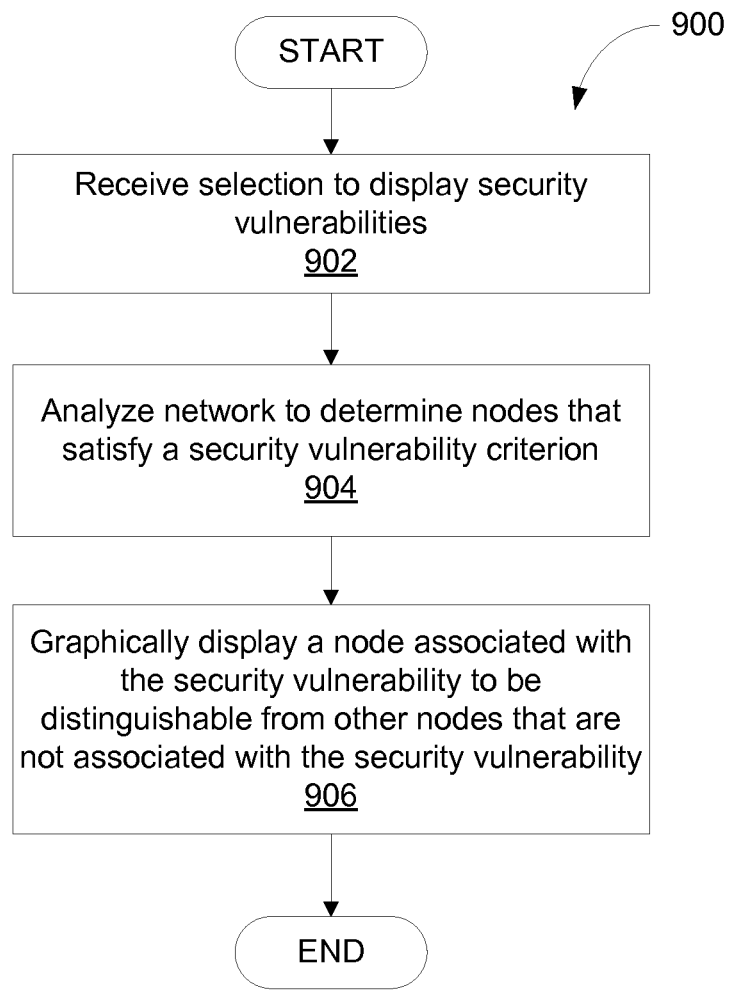
FIG. 9 is a flow diagram for displaying security vulnerabilities, according one embodiment of the invention.

FIG. 9 is a flow diagram for displaying security vulnerabilities, according one embodiment of the invention. Persons skilled in the art would understand that, even though the method 900 is described in conjunction with the systems of FIGS. 1A-7, any system configured to perform the method steps, in any order, is within the scope of embodiments of the invention.

As shown, the method 900 begins at step 902, where the cloud management application 110 receives a selection to display security vulnerabilities. For example, the selection may be received in response to the administrator selecting a button 602 associated with groups of security vulnerabilities, as shown in FIG. 6. At step 904, the cloud management application 110 analyzes the network to determine nodes that satisfy a security vulnerability criterion. In some embodiments, the cloud management application 110 may periodically analyze the network to monitor for nodes that satisfy various security vulnerability criteria. In some embodiments, the security vulnerability criteria are configurable. At step 906, the cloud management application 110 graphically displays a node associated with the security vulnerability to be distinguishable from other nodes that are not associated with the security vulnerability. As described above, in one embodiment, the node may be displayed with a red color. In other embodiments, the node may be displayed in any distinguishable manner.

In sum, one or more embodiments of the invention provide a graphical user interface that displays network connectivity of organizations that are represented as one or more nodes in the graphical user interface. With this graphical user interface, a system administrator can view the network connections of a large number of organizations. Additionally, the administrator can further view network connectivity details of a particular organization, including individual network connections of virtual applications (vApps), VMs, and organizational networks associated with the organization. Further, the nodes in the graphical user interface can be expanded or collapsed "in-place," meaning that the nodes appear in the same location relative to the other organizations in the graphical user interface. Also, in some embodiments, nodes that may exhibit security vulnerabilities can be displayed in a distinguished manner, such as with a different color, to allow the administrator to easily identify these nodes and perform corrective action. By providing these features, a user interface according to one or more embodiments allows the administrator to quickly and easily monitor the status of nodes in the cloud computing environment and perform corrective action, if necessary.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for displaying a graphical user interface for a computing environment including computing resources that are provided to a plurality of nodes over one or more cloud networks, the method comprising:
displaying graphical representations of the one or more cloud networks as horizontal lines;
displaying an aggregate node in the graphical user interface that is associated with a plurality of nodes including a first node;
responsive to receiving a selection to view details of the aggregate node, displaying an expanded view of the aggregate node having a listing of the plurality of nodes within the aggregate node;
receiving a selection of the first node from the listing of the plurality of nodes;
displaying the first node in the graphical user interface, the first node being connected to the representations of at least one of the one or more cloud networks;
upon selection of the first node, updating an aggregate number displayed in the aggregate node in the graphical user interface, the updated aggregate number indicating that the aggregate node is associated with the plurality of other nodes besides the first node which is excluded from the aggregate node responsive to the selection of the first node;
receiving a selection to view details of the first node; and
displaying an expanded view of the first node in the graphical user interface in response to the selection.

2. The method of claim 1, wherein connections to the cloud networks are displayed as another line intersecting the plurality of parallel lines, where a visual indicator at an intersection denotes which cloud networks have network connectivity to the corresponding first node.

3. The method of claim 1, wherein the first node and the aggregate node are displayed above the lines representing the cloud networks.

4. The method of claim 1, wherein displaying the expanded view of the first node comprises displaying the first node in the same location in the graphical user interface relative to adjacent nodes to the first node.

5. The method of claim 1,
wherein the expanded view of the first node includes
(1) representations of one or more sub-networks associated with the first node comprising a second plurality of parallel lines,
wherein the representations of the sub-networks are connected to the representations of the one or more cloud networks, and
(2) network connectivity of one or more virtual applications (vApps) to the representations of one or more sub-networks.

6. The method of claim 5, wherein a first vApp includes one or more virtual machines.

7. The method of claim 1, further comprising analyzing the computing environment for security vulnerabilities, wherein a node is associated with a security vulnerability when a component of the node is directly connected to one or more cloud networks.

8. The method of claim 7, wherein the first node is associated with a security vulnerability and is displayed in a different color than a second node that is not associated with a security vulnerability.

9. The method of claim 7, wherein a node is not associated with a security vulnerability when no components of the node are directly connected to one or more cloud networks.

10. The method of claim 7, wherein a node is not associated with a security vulnerability when all components of the node are connected to the one or more cloud networks through a routed connection.

11. A non-transitory computer-readable storage medium comprising instructions that, when executed in a computing device, provide for displaying a graphical user interface for a computing environment including computing resources that are provided to a plurality of nodes over one or more cloud networks, by performing the steps of:

displaying graphical representations of the one or more cloud networks as horizontal lines;

displaying an aggregate node in the graphical user interface that is associated with a plurality of nodes including a first node;

responsive to a selection to view details of the aggregate node, displaying an expanded view of the aggregate node having a listing of the plurality of nodes within the aggregate node;

receiving a selection of the first node from the listing of the plurality of nodes;

displaying the first node in the graphical user interface that is connected to the representations of at least one of the one or more cloud networks;

upon selection of the first node, updating an aggregate number displayed in the aggregate node in the graphical user interface, the updated aggregate number indicating that the aggregate node is associated with the plurality of other nodes besides the first node which is excluded from the aggregate node responsive to the selection of the first node;

receiving a selection to view details of the first node; and displaying an expanded view of the first node in the graphical user interface in response to the selection.

12. The non-transitory computer-readable storage medium of claim 11, wherein connections to the cloud networks are displayed as another line intersecting the plurality of parallel lines, where a visual indicator at an intersection denotes which cloud networks have network connectivity to the corresponding first node.

13. The non-transitory computer-readable storage medium of claim 11, wherein the first node and the aggregate node are displayed above the lines representing the cloud networks.

14. The non-transitory computer-readable storage medium of claim 11, wherein displaying the expanded view of the first node comprises displaying the first node in the same location in the graphical user interface relative to adjacent nodes to the first node.

15. The non-transitory computer-readable storage medium of claim 11, wherein the expanded view of the first node includes
(1) representations of one or more sub-networks associated with the first node comprising a second plurality of parallel lines, wherein the representations of the sub-networks are connected to the representations of the one or more cloud networks, and
(2) network connectivity of one or more virtual applications (vApps) to the representations of one or more sub-networks.

16. The non-transitory computer-readable storage medium of claim 15, wherein a first vApp includes one or more virtual machines.

17. The non-transitory computer-readable storage medium of claim 11, further comprising analyzing the computing environment for security vulnerabilities, wherein an node is associated with a security vulnerability when a component of the node is directly connected to one or more cloud networks.

18. The non-transitory computer-readable storage medium of claim 17, wherein the first node is associated with a security vulnerability and is displayed in a different color than a second node that is not associated with a security vulnerability.

19. The non-transitory computer-readable storage medium of claim 17, wherein an node is not associated with a security vulnerability when no components of the node are directly connected to one or more cloud networks.

20. The non-transitory computer-readable storage medium of claim 17, wherein an node is not associated with a security vulnerability when all components of the node are connected to the one or more cloud networks through a routed connection.

* * * * *